Figure 1:
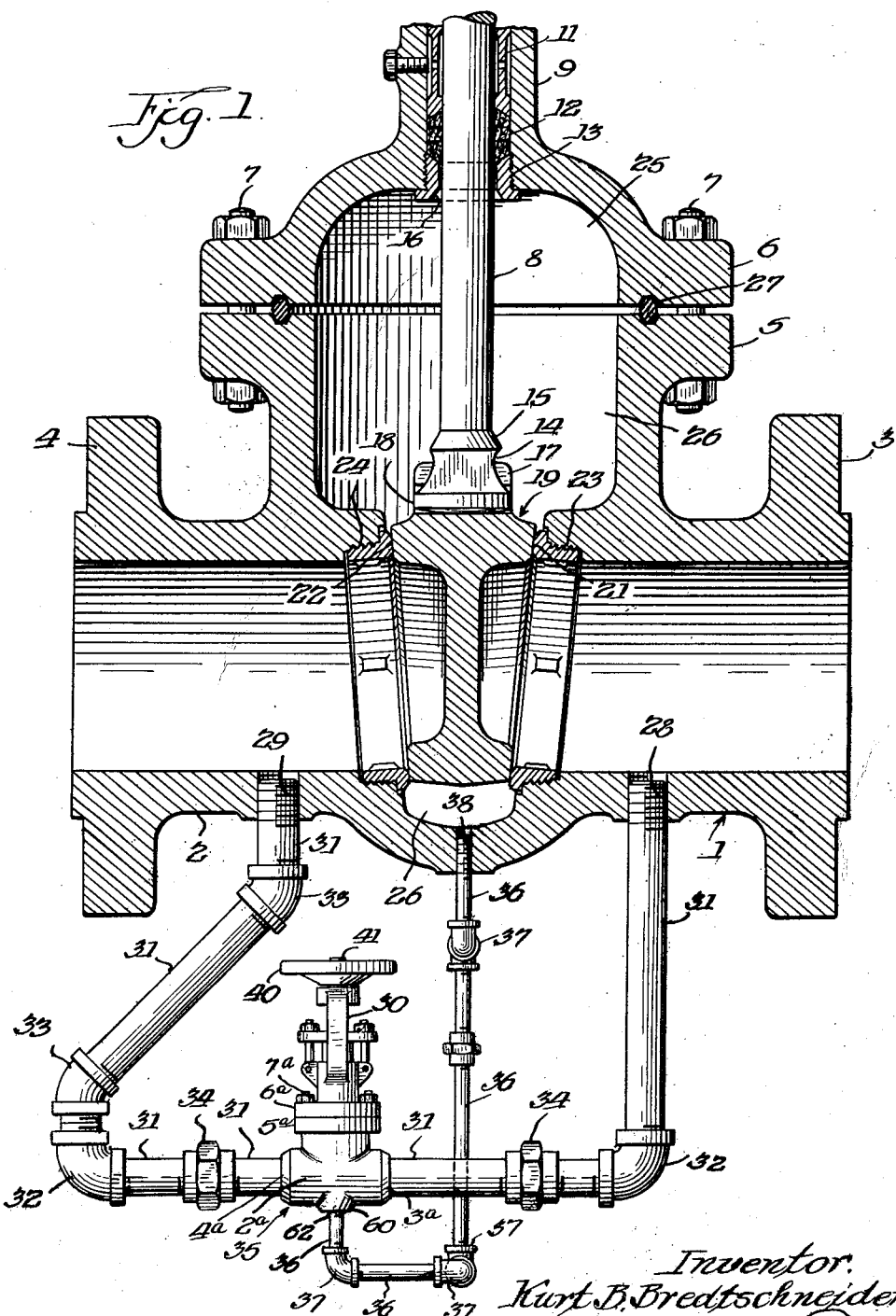

April 28, 1964     K. B. BREDTSCHNEIDER     3,130,742
COMBINED SAFETY RELIEF VALVE AND CONDUIT
Filed Aug. 1, 1961     2 Sheets-Sheet 1

Inventor.
Kurt B. Bredtschneider

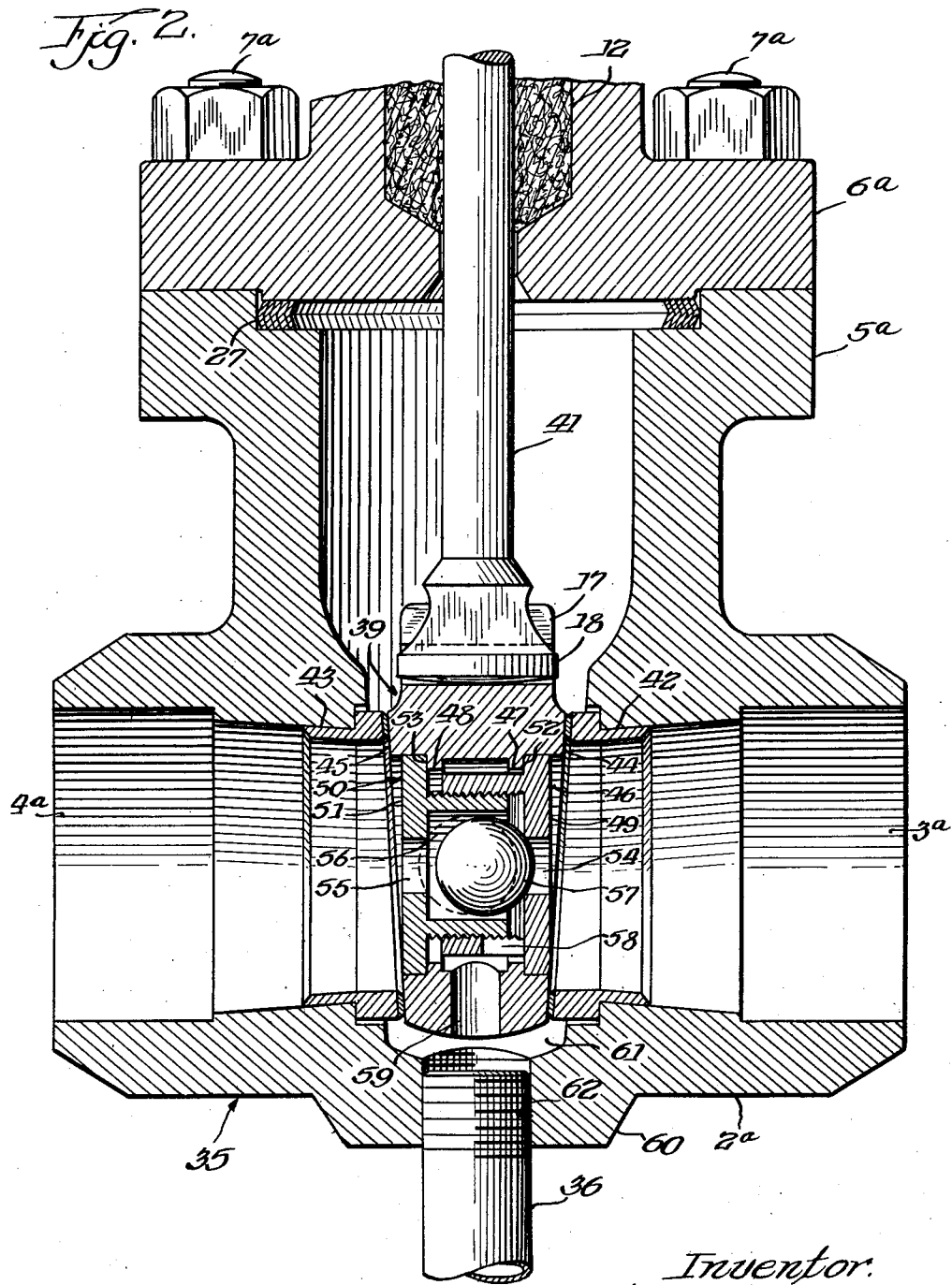

United States Patent Office 3,130,742
Patented Apr. 28, 1964

3,130,742
COMBINED SAFETY RELIEF VALVE
AND CONDUIT
Kurt B. Bredtschneider, Chicago, Ill., assignor to Crane Co., Chicago, Ill., a corporation of Illinois
Filed Aug. 1, 1961, Ser. No. 128,543
2 Claims. (Cl. 137—119)

This invention relates to safety relief valve and conduit means for pressure vessels, and, more particularly, is concerned with a combined gate and check by-pass valve and piping structural arrangement useful for relieving excess fluid pressure occurring under certain conditions encountered in the field, as well as for the usual function of a by-pass stop valve, i.e., the equalization of line pressure with the main valve in the closed position and with the stop valve functioning as a warming-up means of the piping prior to opening the main valve.

At the outset, in order to acquire a better appreciation of the background and the need for this invention, it should be understood that a problem has long existed particularly with respect to gate valves in that the line fluids trapped within the valve bonnet and casing chambers upon being exposed to high temperatures after the valve has been tightly closed has caused expansion of said trapped fluids and created strains and stresses of such degree as to result in operational failures and even in the rupture of the valve itself. Needless to say, the condition is a very serious one and obviously dangerous.

It is, therefore, one of the more important objects of this invention to provide a sturdy, economical, and automatic mechanism for preventing the occurrence of such objectionable excess pressure condition within the valve by suitable relief means responsive to discharge such high fluid pressures automatically when the latter conditions occur.

Another object is to provide for a pressure relief means in which the application can easily be made to valves already installed in the field with only minor adjustment or slight modification necessary for the main valve being so protected.

A further object is to provide for a suitable multiple by-pass structure in which the valve and conduit performing such function can be substantially stock items and easily modified and maintained to provide the desired by-pass stop valve combined with means for effecting fluid pressure relief.

Another object is to provide a by-pass relief and conduit means for use with a gate valve in which there is the assurance of a portion of said relief means being constantly open to relieve the main valve body and bonnet chamber when the gate closure member is in the seated or closed position.

Other objects and advantages will become more readily apparent upon proceeding with the description read in light of the accompanying drawings, in which:

FIG. 1 is a fragmentary sectional assembly view of a gate valve, valve by-pass and piping therefor having a preferred embodiment of my invention; and FIG. 2 is an enlarged fragmentary sectional assembly view of the valve by-pass of this invention referred to in the above description of FIG. 1.

Similar reference numerals refer to similar parts throughout the several views.

Referring to FIG. 1, a gate valve of the solid disc type and generally designated 1 is shown. It consists of the usual valve body or casing 2, and has the conventional means for connection to a pipe line (not shown) as by means of the end flanges 3 and 4. At the upper portion of the valve casing 2, the usual integral flange 5 is provided for effecting the attachment of the valve bonnet 6 to the said casing by means of the bolt studs 7. A stem 8 is journalled within the bonnet at 9 and is provided with a conventional lantern member for effecting such bearing at 11 and with the usual stuffing box packing 12 supported by the stem hole bushing 13 threadedly mounted in the bonnet as shown. The inner end portion of the stem in this particular valve is provided with a T-head 14 and the usual backseating surface 15 for engagement in the open position with the frusto-conical surface 16. Of course, as will be readily apparent, the manner of providing the attachment between the stem and closure member may vary substantially from the disclosure without effecting the inventive scope. Depending from the valve stem 8 and having suitable inwardly turned lugs 17 for engagement of the T-head at 18 a main valve disc or closure member 19 is provided having the oppositely disposed tapered seats 21 and 22 for engagement with the valve removable seat rings 23 and 24. The said removable seat rings may obviously be dispensed with in small size valves, the valve seats being integral with the casing or body, if desired. It will be appreciated that between the said bonnet 6 a chamber 25 therein is complementary to the chamber 26 in the valve casing 2. Significantly, it is with the object of relieving this combined chamber 25 and 26 that this invention is particularly concerned.

As previously referred to, with the valve in the closed position shown and with the condition in service in which the casing 2 or the bonnet 6, or both, are subjected to high temperatures, as, for example, by the direct rays of sun on a hot summer day shining down upon the valve on the pipe line, or exposed to sudden high temperatures from within the pipe line itself, the trapped fluid pressure within the valve chambers 25 and 26 will be expanded considerably. In the latter connection, it is known that with certain types of fluids, such as gasoline, for example, for each degree rise in temperature, there will be a corresponding increase of 75 pounds per square inch rise in pressure. Thus, it will be clear that the fluid expansion is of a very large order and if relief or discharge is not provided for such greatly increased fluid pressure within the said chambers, valve failure can and does occur either in the form of distortion or breakage of the valve or else actual rupture of the valve casing or the valve bonnet occurs or else it leads to excessive leakage by blowing out joints such as the gaskets at 27 between the bonnet and the casing.

With this understanding of the severity of the problem, the description hereinafter following therefore is primarily concerned with a novel solution in the form of a combined by-pass stop and relief valve, the latter valve being coupled with a suitable arrangement of connected piping whereby through such combination it becomes impossible for an objectionable rise in fluid pressure as hereinabove mentioned to take place in the said valve chambers.

Referring to FIG. 1, it will be noted that outwardly beyond the valve seat rings 23 and 24, the main valve casing 2 is suitably tapped through its port walls as at 28 and 29 to receive the threaded piping 31, the latter including the connecting elbows 32 and 33 together with the couplings or pipe unions 34 for attachment of the piping 31 to the said combined by-pass stop and relief valve constituting an important part of this invention and which is generally designated 35. The said by-pass valve at a lower central portion thereof is preferably provided with the communicating discharge piping 36 and a plurality of elbows 37 as required for connection with the main valve body tapping at 38, the said piping communicating with the interior of the casing 2 as defined by the upper and lower chamber portions of the main valve as shown.

It should be noted that the tapped connections 28 and 29 and piping 31 also serve as conventional by-pass valve piping in addition to the relief function hereinafter explained.

Directing attention now to FIG. 2 and to the specific structural details of the novel by-pass valve employed for the purpose of relieving excess pressure in the main valve when the latter is closed as well as for the usual function of a by-pass valve, the by-pass valve generally designated 35 is of a gate valve form, although it may be of frusto-conical or tapered form if desired. The casing 2a receives the closure member generally designated 39 which is of one-piece wedge gate form, the latter being preferably reciprocally movable when suitably actuated by means of the axially movable stem 41, the latter being journalled in the valve and bonnet in substantially the same manner as described in connection with the main valve 1 shown in FIG. 1 in the reference therein to the stem 8. At its end portions, the casing 2a has the pipe connecting sockets 3a and 4a and at its upper portion is provided with the usual bonnet connection 5a and the bonnet 6a, the latter member being maintained in fluid sealing relation by means of the bolt studs 7a and gasket sealed as at 27 in substantially the same manner as described in connection with the main valve of FIG. 1. Stuffing box packing 12 seals the stem 41 in the usual way.

Also following the same general construction as shown in FIG. 1, the closure member 39 at its outer portion has a transversely extending recess 17 for engagement by the T-head 18 of the valve stem 41. The latter member is rotatably actuated by the handwheel 40, the latter being attached to the said stem by the wheel nut 41. A yoke 30 supports the actuating mechanism in the ordinary manner of a valve. The body seat rings here shown as being pressed in positions are applied to the casing as at 42 and 43 thereby to contact the seating surfaces 44 and 45 of the closure member 39 as shown. Obviously, as previously stated in connection with the main valve description, the seat rings 42 and 43 may be made integral with the valve casing 2a without affecting the invention.

The significant modification here of the usual valve closure member occurs in the said by-pass valve construction of FIG. 2. The inner central portion of the closure member 39 is made hollow thereby to form a suitable through chamber 46 having inner peripheral rib portions defined at 47 and 48 with suitable outer annular surfaces against which surfaces a hollow cylindrical member such as the cage member generally designated 50 is abuttingly mounted, as illustrated. It consists of a pair of oppositely disposed threaded spools 49 and 51 in interengaged relation and shouldering at 52 and 53 as shown against said outer annular surfaces. Within the said cage member, the preferably axially aligned ports 54 and 55 are provided to communicate with the respective inlet and outlet ports 3a and 4a of the valve casing 2a. By the spool interengagement described, the interior of the cage 50 is formed with a chamber 56 which is connected with the aligned ports 54 and 55. Within said chamber and for suitable movement therewithin from one end limit to the other, a ball or spheroidal closure member 57 is alternatively seated by its movement to an extent indicated by the circularly extending dotted lines, thereby either closing the port 54 or 55 as influenced by the direction from which excess line fluid pressure is relieved as hereinafter explained in more detail. The particular configuration of the spool 50 may be varied considerably just so that a ported chamber 56 is provided for the ball or similar pressure responsive closure member.

The spool 49 on an annular portion thereof is provided with a suitable transverse port 58 communicating with a downwardly extending through port 59 located in the closure member 39 and leading at its outer end into the casing chamber 61. It will be understood that at its inner end the port 59 is connected with the cage chamber 56 through the port 58 and the annular chamber formed at the open end of the chamber 56 for receiving the ball 57. The shouldered mounting of the spools 49 and 51 against the respective surfaces 52 and 53 of the closure gate 39 assures of the spaced apart relation of the inner annular surfaces of the spools to provide said clearance to connect between chamber 56 and port 58 as aforesaid.

The chamber 61 is tapped as at 62 to receive the discharge pipe 36 entering the casing boss 60, the latter over-all piping arrangement continuing therefrom as shown more clearly in FIG. 1.

Now let it be assumed that an excess fluid pressure condition exists within the combined main valve bonnet and casing chambers 25 and 26, say, arising from a condition as previously referred to. It will be apparent that with the main valve 1 closed as illustrated, the trapped excess fluid pressure in the said main valve chambers will be exerted within the cage 50 and thus cause the by-pass valve sphere 57 therein to move in a direction in the cage toward either the seat defining the inner limits of port 54 or 55, depending upon the fluid condition extant in the latter named ports. The ball obviously will move in a direction toward the port in which the lesser pressure prevails. This being the case, it will be appreciated that the ball 57 may be seated at either end of chamber 56 to cover the port 55 or the port 54 (as shown), depending upon the location of or the absence of a pressure condition. Thus the excess pressure relieving arrangement assures of continuously uniform equalization of line fluid pressure within the closed main valve and any portion of the main piping system. Thus should the pressure condition be reversed in relation to the main piping system, the same pressure relieving action as above described will occur, but in the reverse direction.

The ball for the valve being freely revolvable will have a tendency to roll into its seating position as it closes either port 54 or 55 and thereby lead to a beneficial situation in which the ball is reseated on a new seating surface each time it contacts the annular peripheral limits of the respective ports 54 and 55. It will be appreciated this arrangement is desirable because it tends to keep the valve seat contacts clean and free from cutting and freeing accumulations otherwise normally accumulating on the contact surfaces of a pressure responsive valve. The employment of the gate closure member 39 as a by-pass or secondary valve has the advantage that when desired the valve can be opened to warm up the line of the main valve.

While only a single embodiment in the piping and by-pass valve has been shown, it will be clear ot those skilled in the art that other forms of valve constructions may be easily employed and with equally good results falling within the spirit of this invention.

I claim:

1. In a constantly open relief type of gate valve, the combination of a casing with a valve chamber and an inlet passage and an outlet passage communicating therewith an with oppositely disposed seats defining inner limits of said passages, a one-piece wedge gate movable across the seats of said inlet and outlet passages, the said gate carrying pressure relief means comprising a cage member consisting of oppositely disposed interengaged spools forming therebetween a chamber in communication with said casing valve chamber and having a pressure responsive spheroidal closure member reciprocally movable in the latter chamber, the said latter chamber having axially aligned ports communicating through said spools with said casing inlet passage and outlet passage, said cage member engaging said gate in fluid tight relation at opposite end portions thereof and having a transverse passage continuously communicating with said casing portion thereof between the said seats, the inner limits of said axially aligned ports of said cage member having annular seats alternately receiving said spheroidal closure member depending upon the direction of fluid flow through said cage chamber.

2. The subject matter of claim 1, the said interengaged spools having enlarged peripheral portions shouldering against outer annular recessed surfaces of the said gate.

References Cited in the file of this patent

UNITED STATES PATENTS

| | | |
|---|---|---|
| 529,879 | Schutte | Nov. 27, 1894 |
| 1,932,471 | McKellar | Oct. 31, 1933 |
| 2,351,775 | McMurry | June 20, 1944 |
| 2,619,110 | Griswold | Nov. 25, 1952 |
| 2,670,752 | Laurent | Mar. 2, 1954 |
| 2,718,233 | Krummel | Sept. 10, 1955 |

FOREIGN PATENTS

| | | |
|---|---|---|
| 447,941 | Great Britain | May 2, 1936 |
| 506,418 | Canada | Oct. 12, 1954 |